No. 12,697. REISSUED SEPT. 24, 1907.

B. P. HESS.

DEVICE FOR GRAINING FLOORS.

APPLICATION FILED MAR. 6, 1907.

Inventor
Bonnelyn Purl Hess

Witnesses
W. H. Christman
Clara Gallagher

By Staley & Bowman
Attorneys

THE NORRIS PETERS CO., WASHINGTON, D. C.

UNITED STATES PATENT OFFICE.

BONNELYN PURL HESS, OF GOSHEN, INDIANA, ASSIGNOR TO THE RIDGELY TRIMMER COMPANY, OF SPRINGFIELD, OHIO, A CORPORATION OF WEST VIRGINIA.

DEVICE FOR GRAINING FLOORS.

No. 12,697. Specification of Reissued Letters Patent. Reissued Sept. 24, 1907.

Original No. 835,067, dated November 6, 1906, Serial No. 308,534. Application for reissue filed March 6, 1907. Serial No. 360,986.

*To all whom it may concern:*

Be it known that I, BONNELYN PURL HESS, a citizen of the United States, residing at Goshen, in the county of Elkhart and State of Indiana, have invented certain new and useful Improvements in Devices for Graining Floors; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in devices for graining floors, boards, etc.; and the object of the invention is to produce a simple and efficient article of this nature comprising, essentially, a semi-cylindrical stamp of flexible material bearing the imitation of the grain of wood and in which stamp is embedded a resilient plate to which handles are pivoted, thereby forming means whereby the surface of the stamp may be made to conform to concaved or uneven surfaces to be grained by curling same as hereinafter specified.

My invention consists in other details of construction and arrangements of parts, which will be hereinafter fully described and then specifically defined in the appended claims.

I illustrate my invention in the accompanying drawings, in which—

Figure 1:
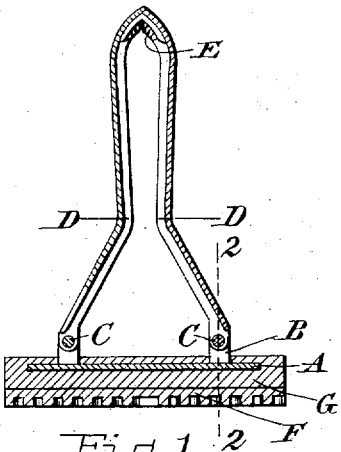
Figure 2:
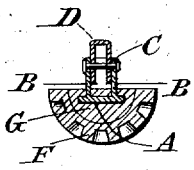

Figure 1 is a sectional view longitudinally through my stamp. Fig. 2 is a cross-sectional view, and Fig. 3 is a side elevation showing in dotted lines the stamp curved longitudinally to conform to irregular or concaved surfaces.

Reference now being had to the details of the drawings by letter, A designates a metallic plate which may be made of any resilient material and is provided with ears B, secured thereto and which carry pins C, upon which the handles D are pivoted. Said handles are preferably angled, as shown, and form convenient means whereby the two may be gripped by one hand of an operator. The outer ends of the handles are preferably held together by means of a pivot-pin E. F designates a semicylindrical impression-surface made, preferably, of an elastic material, such as rubber, and which is adapted to bear the imitation of the grain of wood desired to be transferred. This semi-cylindrical impression surface has a series of raised surfaces, $F^1$, said surfaces being formed substantially concentric with their center at $F^2$. Said elastic surface has preferably a suitable backing, G, in which said plate is embedded, said backing being preferably of rubber.

Figure 3:
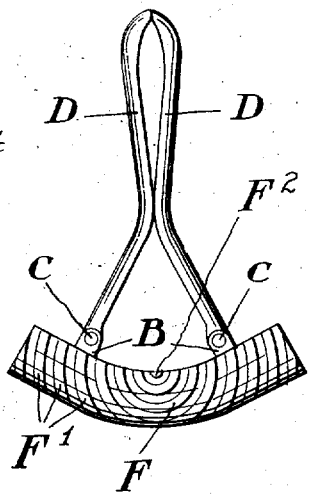

From the construction shown it will be observed that when it is desired to transfer a design upon a concaved or uneven surface, by grasping the handles in the usual way and pressing the same together, the stamp may be curled as shown in Fig. 3. By releasing the pressure upon the handles the stamp will resume its normal straight position.

In applying the transfer the stamp is held in contact with a pad saturated with the coloring material or against any surface upon which the material has been coated and afterward the stamp applied to the surface to be grained and rocked over the surface thereof.

From the foregoing it will be noted that by the provision of the graining implement shown and described a simple and efficient means is afforded whereby the grains of various woods may be formed upon the impression-surface and readily transferred to any desired surface.

What I claim is—

1. In a graining device, the combination of a stamp of semi-cylindrical shape comprising an outer portion of flexible material such as rubber, an inner portion of resilient material less flexible than the outer portion, a series of curved segmental raised surfaces substantially concentric and extending across the surface of the stamp, a handle projecting from the inner portion and adapted to rock the stamp upon its axis while the raised surfaces are subjected to uniform pressure throughout.

2. A graining device comprising handle, stamp of elastic material, and a flexible support for the handle within the stamp, and means connecting the handle and flexible support whereby force exerted upon the handle will curl the stamp out of normal position, substantially as specified.

3. A graining tool comprising a resilient plate, handles pivoted thereto and connected together, a transferring-surface of elastic material and a backing for the latter in which said plate is embedded, as set forth.

4. A graining tool comprising a plate of resilient material, ears projecting therefrom, pivot-pins carried by said ears, a transferring-surface having a backing of elastic material on which said plate is embedded, handles pivotally mounted upon said pins and so arranged that when the handles are forced together, said plate and the transferring-surface may be caused to yield, as set forth.

5. A graining tool comprising a plate of resilient material, ears projecting therefrom, pivot-pins carried by said ears, a transferring-surface having a backing of elastic material in which said plate is embedded, and angled handles pivotally connected to said pins and connected together at their outer ends, as set forth.

BONNELYN PURL HESS.

Witnesses:
W. P. HESS,
ETHAN A. DANSMAN.